(12) United States Patent
Kyte et al.

(10) Patent No.: US 10,831,835 B2
(45) Date of Patent: Nov. 10, 2020

(54) PROVIDING HYPERLINKS IN PRESENTATIONS VIEWED REMOTELY

(71) Applicant: INTERNATIONAL BUSINESS MACHINES CORPORATION, Armonk, NY (US)

(72) Inventors: Adrian Kyte, Broadstone (GB); Bei Chun Zhou, Beijing (CN); Jenny J. He, Chandler's Ford (GB); Guan Jun Liu, Hai Dian District (CN); Joe Winchester, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 15/879,676

(22) Filed: Jan. 25, 2018

(65) Prior Publication Data

US 2019/0228079 A1 Jul. 25, 2019

(51) Int. Cl.
*G06F 16/93* (2019.01)
*H04L 12/18* (2006.01)
*H04L 29/08* (2006.01)
*H04L 29/06* (2006.01)

(52) U.S. Cl.
CPC .......... *G06F 16/94* (2019.01); *H04L 12/1822* (2013.01); *H04L 65/604* (2013.01); *H04L 67/08* (2013.01)

(58) Field of Classification Search
CPC ....... G06F 16/94; G06F 9/543; H04L 65/604; H04L 67/08; H04L 12/1822
See application file for complete search history.

(56) References Cited

U.S. PATENT DOCUMENTS

| | | | |
|---|---|---|---|
| 9,049,478 B2 | 6/2015 | Schneider | |
| 9,411,789 B1 | 8/2016 | Chitta et al. | |
| 9,417,765 B1 | 8/2016 | Lewis et al. | |
| 2010/0259559 A1* | 10/2010 | Schneider | H04N 7/147 345/629 |
| 2012/0304292 A1* | 11/2012 | Liu | H04L 61/30 726/22 |
| 2013/0132862 A1 | 5/2013 | Noel et al. | |
| 2013/0254682 A1* | 9/2013 | DeLuca | G06F 16/9558 715/753 |
| 2017/0118271 A1* | 4/2017 | Reyes | H04L 67/06 |

(Continued)

OTHER PUBLICATIONS

Cimatti, Alessandra, "How to Activate URL Links in Slideshare," SlideCoachin.com, Apr. 12, 2010, pp. 1-6.

(Continued)

*Primary Examiner* — Caroline H Jahnige
(74) *Attorney, Agent, or Firm* — Noah Sharkan, Esq.; Kevin P. Radigan, Esq.; Heslin Rothenberg Farley & Mesiti P.C.

(57) ABSTRACT

Providing hyperlinks in presentations viewed remotely. A current user interface of an application being shared or recorded in a presentation for remote viewer computer systems is identified. An accessibility application programming interface is used to obtain a data structure of elements in the current user interface. The elements in the data structure are interrogated to identify elements including hyperlinks. Hyperlink information for an identified element is captured, and provided for use by a remote viewer computer system.

20 Claims, 7 Drawing Sheets

(56) References Cited

U.S. PATENT DOCUMENTS

2018/0145840 A1* 5/2018 Advani .............. H04L 12/1822
2018/0183752 A1* 6/2018 Petersen ................ H04L 67/32

OTHER PUBLICATIONS

Anonymous, "8 Reasons Hyperlinks Don't Work in Online PPT Presentations," ispringsolutions.com, downloaded from internet Apr. 27, 2017, pp. 1-19.

* cited by examiner

PROVIDING HYPERLINKS IN PRESENTATIONS VIEWED REMOTELY

BACKGROUND

One or more aspects of the present invention relate to presentations provided via a network, and more specifically, to providing hyperlinks in presentations viewed remotely.

Sharing presentations via a network, such as the Internet, takes many different forms. Web conferencing describes online collaborative services including web seminars, webcasts, web meetings, etc. Web conferencing uses Internet technologies to provide services to allow real time, point-to-point and multicast communications from a sender to one or more receivers. Software enabling web conferencing may be run in different ways including: on web browsers, using installed conferencing software on each participant's computer, or via a hosted web service.

It often occurs that viewers of a real time, shared presentation are presented with hyperlinks on screen, often being discussed as a part of the presentation. In order to follow the hyperlinks, the viewers have to either find links themselves or interrupt the presenter to gain access to the links available. For example, a team leader may be reviewing work items in a web based workflow management system and a user may not know what a particular work item is. To find out, the user would need to open a web browser, navigate to the page being presented, and click on the work item to find more information.

The presentation may show charts, web browser pages, documents, etc. all of which may contain hyperlinks to a linked web page or some other linked application.

For users watching a presentation that contains embedded hyperlinks, they may have to access the original presentation file so that they can follow the links on their own computer. This involves the presenter sharing the presentation file, which has problems because often users logged onto a conference have an older version or may not have the ability to download the file.

Another known method is for viewers of the presentation to ask for the hyperlink to be made available and the presenter or someone else on the session or associated with the session may provide the link.

A further method is that the presentation does not embed the hyperlink behind text, but instead, includes the entire link's Uniform Resource Locator (URL) in the presentation. Viewers of the presentation may then re-enter the URL on their browsers. This has the drawback that URLs are often large and difficult to re-type.

SUMMARY

Shortcomings of the prior art are overcome and additional advantages are provided through the provision of a computer-implemented method of providing hyperlinks in presentations viewed remotely. The computer-implemented method includes, for instance, identifying a current user interface of an application being shared or recorded in a presentation for remote viewer computer systems. An accessibility application programming interface is used to obtain a data structure of elements in the current user interface. The elements in the data structure are interrogated to identify one or more elements including hyperlinks. Hyperlink information is captured for the one or more elements identified, and the hyperlink information is provided for use by a remote viewer computer system.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1A:
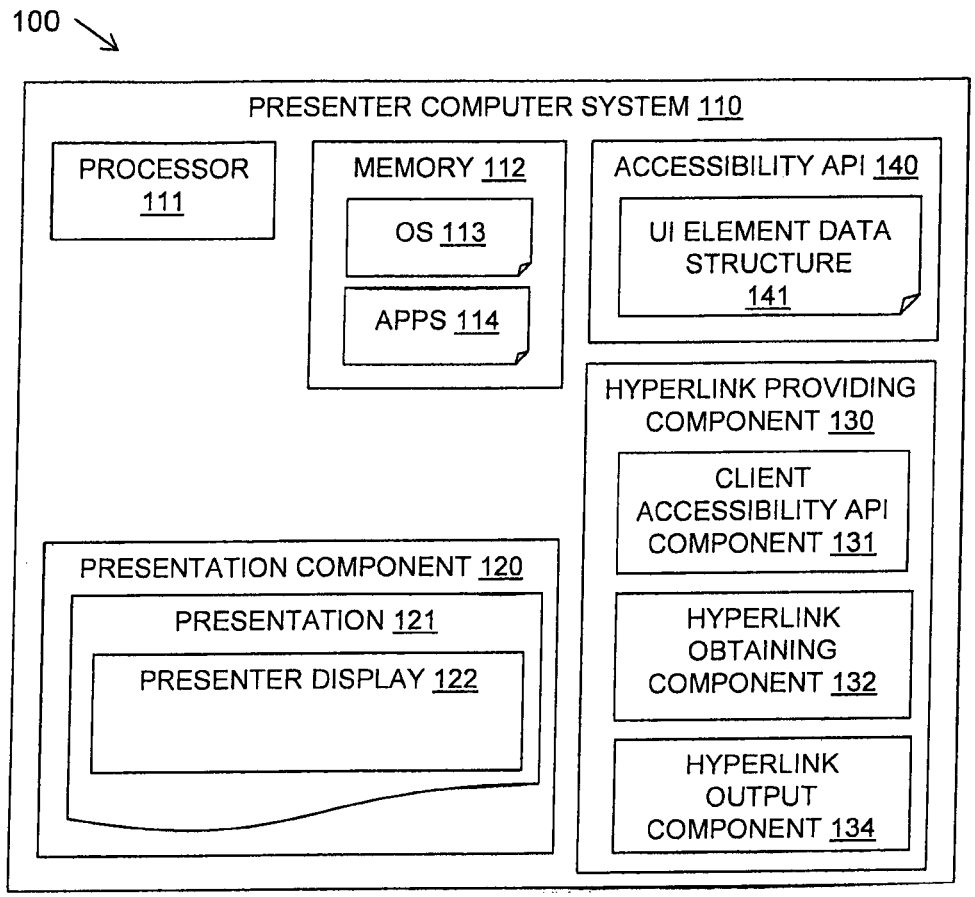
FIGS. 1A-1B are examples of block diagrams of an example embodiment of aspects of a system in accordance with an aspect of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

One or more aspects enable hyperlinks in presentations to be transmitted to one or more viewers of the presentation via a network. A presentation may be broadcast or shared with remote viewers via a network communication and may be shared as a live presentation in real time, as a recording of a live presentation, or as a pre-recorded presentation. A hyperlink may be to a web page, document or some other application, for example, a database link. For example, a hyperlink may be a Hypertext Transfer Protocol (HTTP) link or Hypertext Transfer Protocol Secure (HTTPS) link in the form of direct target Uniform Resource Locators (URLs).

The hyperlink information including the link destination of the hyperlinks is obtained as described below for hyperlinks in an application, web browser or other display at a presenter computer system. The hyperlink information may be transmitted sequentially with the presentation data or, alternatively, the hyperlink information may be associated with the presentation data by reference to timestamps in the duration of the presentation.

The hyperlink information may be received at a viewer computer system and displayed as hyperlinks for activation by a remote viewer. The hyperlinks may be displayed at the same time as the screen display area of the presentation, adjacent to the display area or as overlays to the display area of the presentation.

One or more aspects use accessibility application programming interfaces (APIs) to obtain details of hyperlinks in an application, web browser or other display being presented by the host.

Accessibility APIs are available as part of an operating system's windowing toolkit API and exploited by accessibility technologies, such as screen readers, so that when a user of a graphical user interface (GUI) tabs to control when focus is received, the accessibility API "reads" the details of the control. This allows a user to tab to a text field and hear the screen reader announce the associated label.

If the control is a hyperlink, then this may be sent to the system output as a property value that the screen reader is configured to interpret. In known assisted technologies, this may allow a user to select a label that is a hyperlink and obtain, first the label text, and then, by asking for the property, to hear the hyperlink Uniform Resource Locator (URL) itself. The accessibility API may pass the hyperlink details to the caller of the API to be announced through a system output queue. This technique is used by various accessibility APIs provided for different operating system platforms.

One or more aspects use this functionality of an accessibility API to obtain hyperlink information and pass this to a presentation viewer in order for the hyperlinks to be available at the viewer system.

Referring to FIG. 1A, a block diagram shows an example system 100 in which one or more of the described aspects may be implemented. A presenter computer system 110 may include at least one processor 111, a hardware module, or a circuit for executing the functions of the described components which may be software units executing on the at least one processor. Memory 112 may be configured to provide instructions of operating system 113 and applications 114 to the at least one processor 111.

The presenter computer system 110 may include a presentation component 120 for providing a presentation 121 via a network conferencing method. The presentation component 120 may be, for example, a web browser, conferencing software installed on the presenter computer system 110 with corresponding software on each viewer computer, a hosted web service, etc.

At a given time in the presentation 121 a presenter display 122 may be displayed. The presentation may be a video, a web page, a series of slides, an application, or other media content provided during a transmitted presentation.

Conferencing may allow real time or recorded point-to-point communications or multi-cast communications from one sender to many receivers. It may provide presentations to be shared simultaneously across geographically dispersed locations. In general, web conferencing is made possible by Internet technologies, particularly on Transmission Control Protocol/Internet Protocol (TCP/IP) connections. Presentations may also be shared on private or corporate networks. Applications for conferencing providing presentations include meetings, training events, lectures, etc. from a network connected computer to other network connected computers.

Figure 1B:
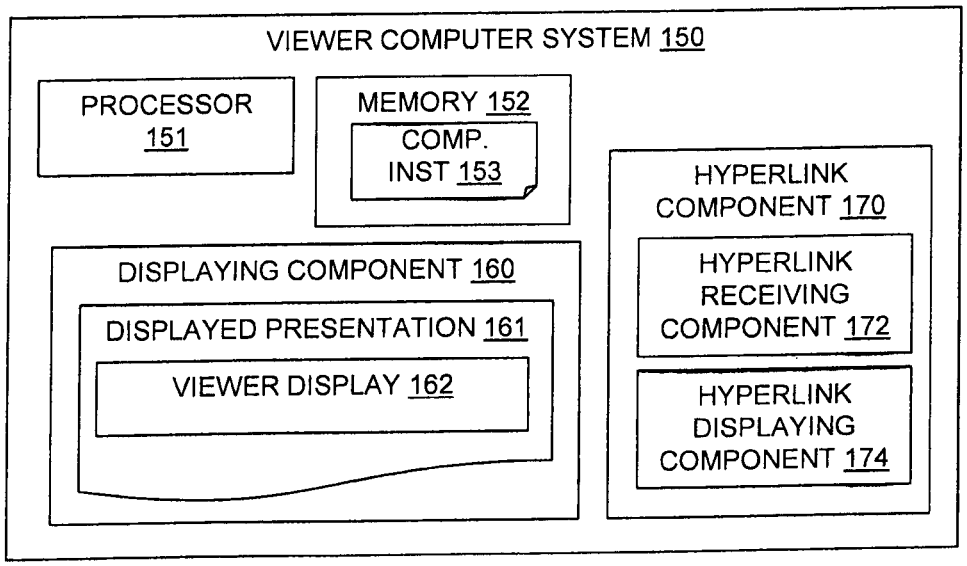

Referring to FIG. 1B, multiple viewer computer systems 150 (which may be another part of system 100) may view the presentation 121 supplied by the presenter computer system 110. A viewer computer system 150 may include at least one processor 151, a hardware module, or a circuit for executing the functions of the described components which may be software units executing on the at least one processor. Memory 152 may be configured to provide computer instructions 153 to the at least one processor 151 to carry out the functionality of the components.

A viewer computer system 150 may include a displaying component 160 for showing a displayed presentation 161 via a network conferencing method. The displaying component 160 may be, for example, a web browser, conferencing software installed on the viewer computer system 150, a hosted web service, etc. At a given time in the displayed presentation 161, a viewer display 162 may be on view. This viewer display 162 may correspond to the presenter display 122.

One or more aspects of the described system provide a hyperlink providing component 130 (FIG. 1A) at the presenter computer system 110 for providing details of viewable hyperlinks in the presentation 121. The hyperlink providing component 130 may include a client accessibility application programming interface component 131 for interacting with and using an accessibility application programming interface (API) 140 of the presenter computer system 110 including a user interface element data structure 141 of the elements of a current presentation 121. The hyperlink providing component 130 may transmit the details of the viewable hyperlinks with the presentation 121 to a corresponding hyperlink component 170 (FIG. 1B) at a viewer computer system 150.

The hyperlink providing component 130 may include a hyperlink obtaining component 132 for obtaining hyperlink information from the presentation 121 and a hyperlink output component 134 for transmitting or otherwise providing the hyperlink information for a viewer computer system 150. The link component 170 may include a hyperlink receiving component 172 for receiving the hyperlink information with the presentation 121 and a hyperlink displaying component 174 for displaying hyperlinks generated from the hyperlink information on or in association with the displayed presentation 161 at the displaying component 160. Further details of these components are described below.

Accessibility APIs are provided by platforms to help assistive technology products interact with standard and custom user interface (UI) elements of an application or the operating system, as well as to access, identify, and manipulate an application's UI elements.

An accessibility framework provides the accessibility APIs and may be considered as a client-server architecture. Assistive technologies may be considered to be the clients of that framework, and computer applications may be considered to be the server. In this architecture, client and server are to communicate with each other, usually using the inter-process communication (IPC) technology of the platform.

Usually the accessibility API for both client-side and server-side applications is the same, and the accessibility framework provides a client-side and a server-side implementation of the accessibility API. In the case of GNOME (GNOME is a trademark of the GNOME Foundation), there are two different APIs, one for the client-side (AT-SPI) and a different one for the server-side (Accessibility Toolkit (ATK)) due to historical reasons related to the underlying technologies. These are referred to generally as accessibility APIs.

Accessibility APIs allow UI controls to expose basic information, such as name, location on screen, or type of control, and state information, such as visibility, enabled, or selected. Accessibility APIs may use a Component Object Model (COM) to define a mechanism for applications and operating systems to communicate.

Applications expose a tree structure that represents the structure of the UI. Each element of this tree exposes a set of properties and methods that allow the corresponding UI element to be manipulated. Accessibility API clients can access the programmatic UI information through the accessibility API.

In the case of web browsers, they may support one or more platform accessibility APIs and may use the Hypertext Markup Language (HTML) Document Object Model (DOM) and further information derived from the Cascading Style Sheets (CSS) to generate a tree hierarchy of content in the display.

In this way, accessibility API clients can query an operating system, an application or web browser for what is currently being displayed and receive updates when the display changes using the accessibility API.

In the described aspects, the hyperlink providing component acts as a client of the platform accessibility API of the presenter computer system.

Figure 2:
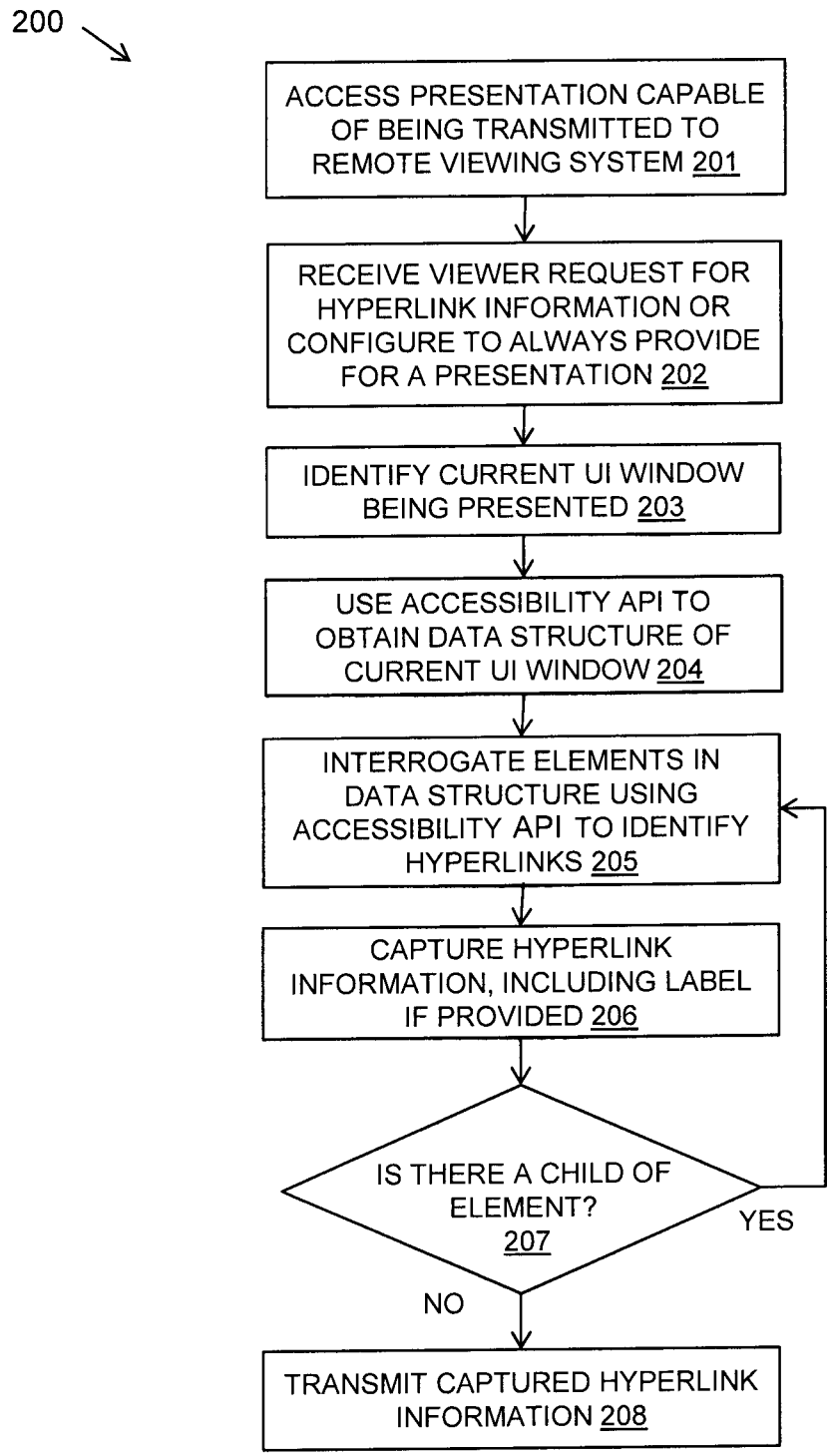
FIG. 2 is one example of a flow diagram of an example embodiment of a method in accordance with an aspect of the present invention.

Referring to FIG. 2, a flow diagram 200 shows an example embodiment of an aspect of the described method for providing hyperlinks in a presentation. The method is carried out by a presenter computer system, which may be, for example, a personal computer, a server, or a cloud based server. A hyperlink providing component 130 at the presenter computer system 110 may carry out aspects of the described method to interrogate the presenter computer system via an accessibility API of the presenter computer system.

In one example, the method accesses 201 a presentation (e.g., presentation 121) capable of being transmitted to one or more remote viewing systems (e.g., viewer computer system 150) as presentation data. The presentation may be a display (e.g., presenter display 122) of one or more applications or a web browser running on the presenter computer system. In one embodiment, the presentation may be transmitted as a live presentation that is streamed as display frames at a rate per second. In another embodiment, the presentation may be a recording of a previously transmitted live presentation, where the live transmission has been recorded at the presenter computer system (e.g., presenter computer system 110) as it has been transmitted live and the recording may be transmitted at a later date or dates. In a further embodiment, the presentation may be a pre-recorded presentation that is recorded during production of the presentation for transmission only as a pre-recorded presentation.

A request may be received 202 from a viewer of the presentation (e.g., viewer computer system 150) to request hyperlinks for a current presentation (e.g., hyperlink receiving component 172) that then drives the function at the presenter's computer system. Alternatively, a presentation component (e.g., presentation component 120) may be configured to automatically supply the hyperlinks for a presentation (e.g., presentation 121). In the case of a pre-recorded presentation, the method may record all the hyperlink information as metadata with the presentation recording.

The method may identify 203 the current UI window being presented to viewers and may use 204 the accessibility API (e.g., accessibility API 140) of the platform of the presenter computer system to obtain a data structure (e.g., UI element data structure 141) of the current UI window. It may use the ability of the accessibility API to interrogate the operating system for the top-level window being displayed, as well as its contents, and recurse through the contents to determine a graph or hierarchical tree structure of the controls of the window.

Accessibility APIs may include functionality for providing a hierarchical tree of a current user interface, such as an application window that contains objects of the elements. In the case of browser windows, the HTML DOM may be used to provide the information about the rendered content.

Each control in the data structure may be interrogated 205 using the accessibility API and its properties analyzed for the presence of a hyperlink. This may be carried out by locating the presence of hyperlink URLs, where the URLs may be within a label, a button, a form, a native hyperlink control, etc. A hyperlink may be to a web page, document or some other application, for example, a database link.

The analysis that identifies 205 the presence of a hyperlink may take various forms.

In one embodiment, for each element (e.g., GUI element), an accessibility API for the platform may be called with the window handle of the control and the properties inspected for the presence of any hyperlinks, by virtue of the links being prefixed http://, https://, ftp:// and other known URL protocols.

If the presentation is using a web browser, the HTML DOM may be used to identify the hyperlinks. The element may be defined in the accessibility API by a role that may indicate that the element is a link, for example, a HTML element having attribute of the element of <a> for a hyperlink.

If a control is found that has a hyperlink, the hyperlink information may be captured 206. The hyperlink information may include the hyperlink URL. In some embodiments where the hyperlink is behind a label, both the label and the hyperlink may be captured as the hyperlink information. For each hyperlink, a buffer may be created for the hyperlink information.

It may be determined 207 if a control is found that has children (such as a form with embedded controls that may themselves have children). Then, the child controls are iterated through. At the end of the iteration, in one example, over all of the windows and all of their controls, all hyperlinks will have been discovered whether they are in a UI control itself, in a document hyperlink, a presentation or a browser. Each application depending on how it is written may use hyperlinks differently either with native controls or through soft labels; however, to meet accessibility guidelines the application is to return the information to the accessibility API making this a normalizing interface.

The captured hyperlink information may be output (e.g., via hyperlink output component 134) by being transmitted 208 to either all viewers or a viewer who requested the hyperlinks. In some embodiments if the hyperlink is behind a label, such as in presentation software or a browser hypertext reference (href) tab, both the label and the hyperlink may be transmitted 208 allowing a user viewing the hyperlinks to see which label text each hyperlink is associated with, or directly after.

In the case of a pre-recorded presentation, the method may record all the hyperlink information as metadata with the presentation recording and make them available and transmit 208 them as part of the recording.

Figure 3:
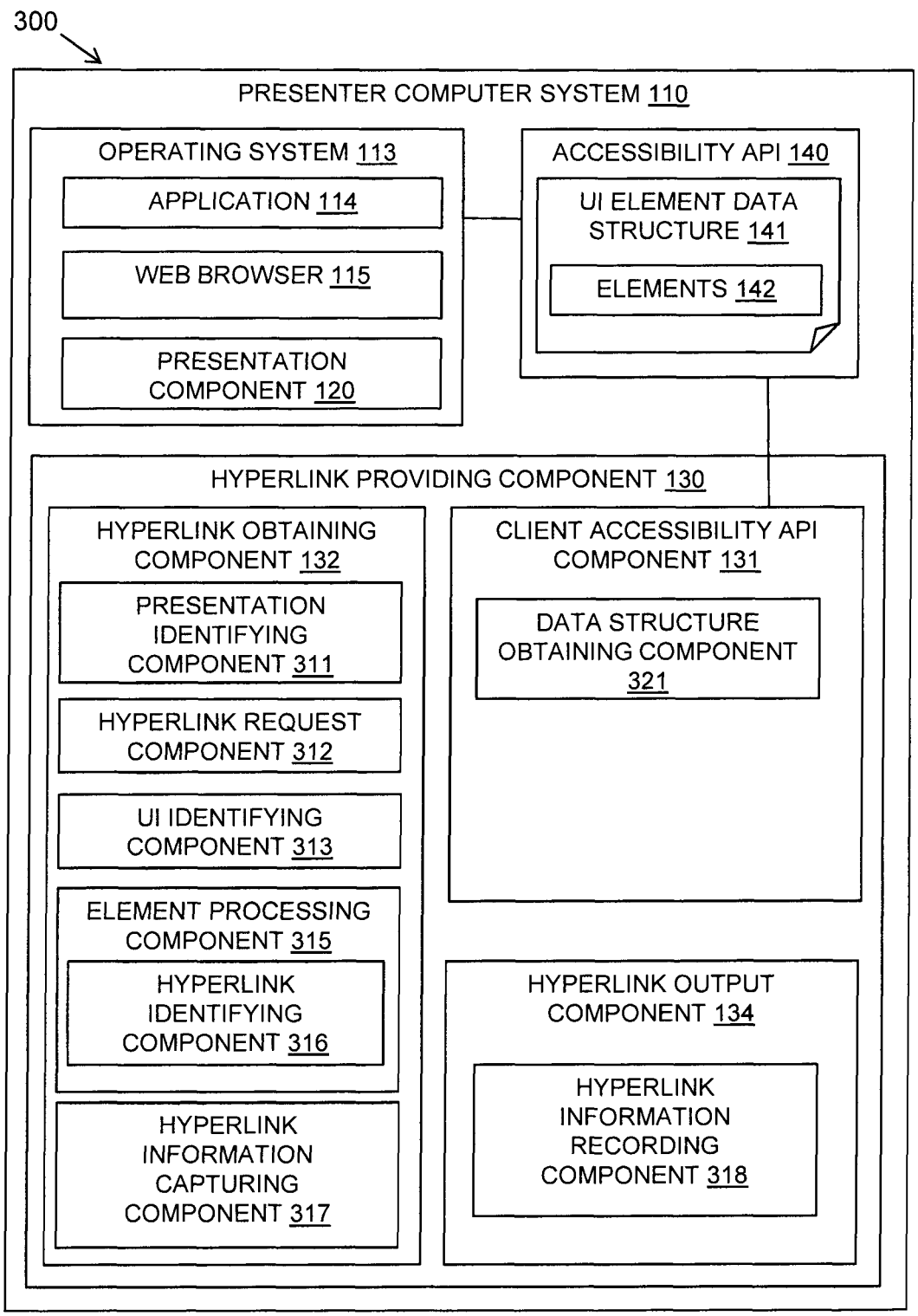
FIG. 3 is one example of a block diagram of an example embodiment of a system in accordance with an aspect of the present invention.

Referring to FIG. 3, a block diagram shows further components of an example embodiment 300 of the hyperlink providing component 130 of the presenter computer system 110 as shown in FIG. 1A.

The presenter computer system 110 may include an operating system 113 on which applications 114, that may include a web browser 115, may run. A presentation component 120 may also run on the operating system 113 or may be provided as a remotely run application. An accessibility API 140 may be provided for the operating system 113.

The hyperlink providing component 130 may include a presentation identifying component 311 for identifying and accessing a presentation being provided at the presenter computer system 110 using an application 114, web browser 115 and/or a presentation component 120.

The hyperlink providing component 130 may include a user interface identifying component 313 for identifying a current user interface of an application 114, 115 being shared in a presentation to one or more remote viewer computer systems. The application may be a web browser 115 or any other form of application that may be shared as a presentation from the presenter computer system 110. The application 114, 115 may be part of a presentation being recorded for later transmission.

The hyperlink providing component 130 may include a hyperlink request component 312 for receiving a request from a remote viewer computer system to provide hyperlink information for a current user interface. Alternatively, the hyperlink request component 312 may configure a user interface of an application being shared in a presentation to send all hyperlinks in a current user interface. In the case of a recorded presentation, the hyperlink request component 312 may provide the hyperlink information for recording as metadata in the presentation.

The hyperlink providing component 130 may include a client accessibility API component 131 for interacting with the accessibility API 140 and may include a data structure obtaining component 321 for obtaining a data structure 141 of elements 142 in the current user interface of the application.

The hyperlink providing component 130 may include an element processing component 315 for interrogating the elements 142 in the data structure 141 to identify elements including hyperlinks. The element processing component 315 may iterate through child elements of the data structure 141 to interrogate all the elements 142 in the user interface of the application.

The element processing component 315 may include a hyperlink identifying component 316 for identifying elements including hyperlinks by identifying a hyperlink protocol prefix or by identifying a role of an element provided in the data structure 141.

The hyperlink providing component 130 may include a hyperlink information capturing component 317 for capturing hyperlink information for an identified element. This hyperlink information may be buffered by a hyperlink output component 134 for transmitting the hyperlink information to a remote viewer computer system or for providing, e.g., via a hyperlink information recording component 318, the hyperlink information as metadata in a recorded presentation.

As shown in FIG. 1B, a hyperlink component 170 may be provided at a viewer computer system 150 for cooperation with the hyperlink providing component 130 of the presenter computer system 110. The hyperlink component 170 may include an input receiving control, such as the request button shown in FIG. 4B for receiving a request for hyperlink information for a current user interface of an application.

The hyperlink component 170 (FIG. 1B) at a viewer computer system 150 may also include a hyperlink receiving component 172 for receiving hyperlink information and a hyperlink displaying component 174 for displaying the hyperlink information in association with a display of the user interface of the application being shared in a presentation from a presenter's computer system.

The described aspects allow users in a screen sharing conference to request for the hyperlinks embedded within the display being shared.

In one embodiment, the hyperlinks are determined by walking a graph of controls and composites that make up the top-level window in a recursive fashion so each element of the GUI is analyzed.

Figure 4A:
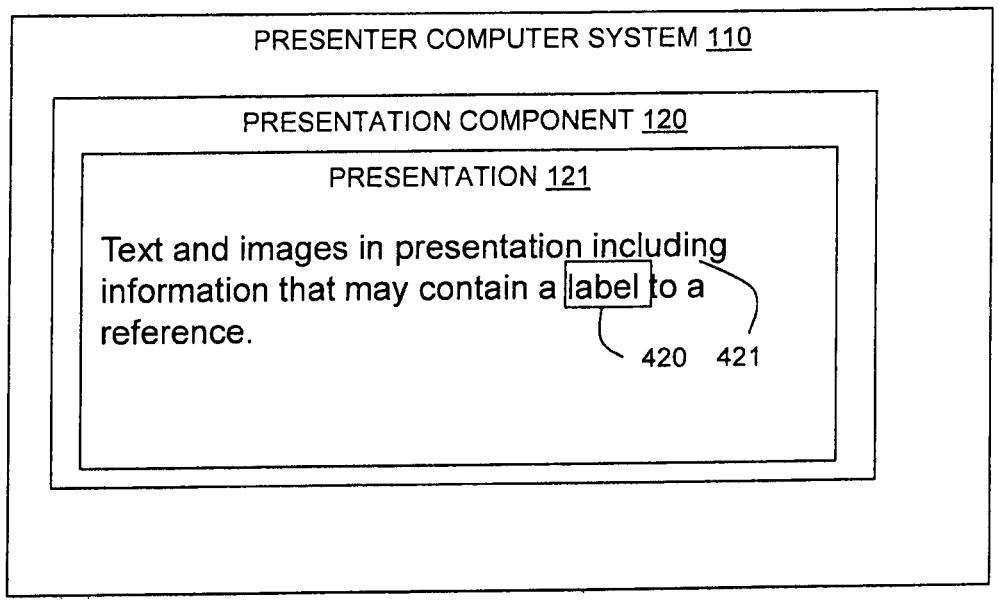
FIGS. 4A-4B are examples of schematic diagrams of example embodiments of aspects of the present invention.
Figure 4B:
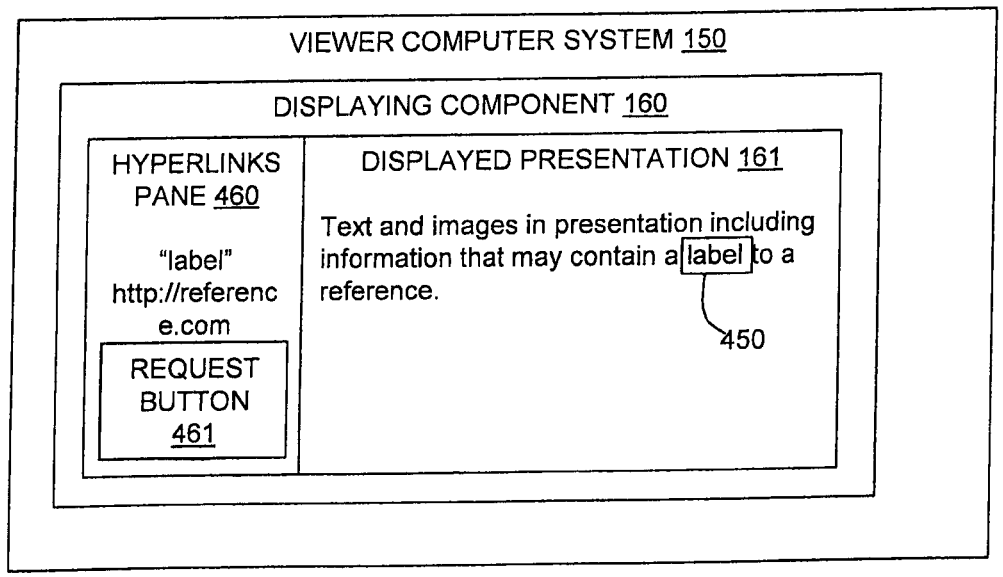

Referring to FIGS. 4A-4B, a block diagram shows an example embodiment 400 of a presentation 121 displayed on a presentation component 120 of a presenter computer system 110 and the corresponding displayed presentation 161 on a displaying component 160 of a viewer computer system 150. The presentation 121 is displayed and includes a label 420 for a hyperlink that is captured and provided to the viewers. In this example, the presentation 121 includes text 421 and the label 420 has an anchor area surrounding a word.

The displayed presentation 161 is displayed with the corresponding label 450 provided in the displaying component 160. The displaying component 160 may include a hyperlinks pane 460 including a request button 461 for requesting hyperlinks. The hyperlinks pane 460 may receive the hyperlinks from the presenter computer system 110 and may display the hyperlink URLs in association with an identifier, the label.

In the web conference for the users watching the screen sharing they are able to request the hyperlinks on the page being currently displayed. In the example of FIGS. 4A-4B, this is with a request button 461, so the request can be activated when the button is pressed; alternatively, an implementation may leave the button on all the time so all hyperlinks are transmitted at all times to the users in the conference.

The presentation may be discussing a work item that may include a number of hyperlinks or labels to hyperlinks that may be underlined or shown in a color of text. A user watching may want to follow these hyperlinks and may press the request button 461. This then issues a command to the presentation component 120 doing the projecting. This may activate the hyperlink providing component described that passes the top-level window being shared and to an analyzer that uses the accessibility API to analyze the application being shared. For each control found, its properties may be read to determine whether a hyperlink is present and this may then be captured and transmitted to the viewer of the conference.

The hyperlink information may be displayed in the hyperlinks pane 460 at the viewer computer system 150 enabling the viewer to activate the hyperlink to open the linked reference, such as a page, document, or application.

One advantage of this process is that it works with all occurrences of hyperlinks in a presented application, such as a desktop application being shared, for example, a slide presentation, a text editor document, a web browser, etc. The hyperlinks are made available to the viewers of a web conference so that they can follow the links from their own computer and they can see the URLs behind hyperlinks in any desktop application being shared.

The presenter can show a range of displays, such as charts, web browser pages, documents, all of which contain, e.g., hyperlinks and, without interruption, viewer of the web conference can see the hyperlinks that form part of the presenter's GUI allowing them to open the URLs in the hyperlinks in their own desktop environments.

Figure 5:
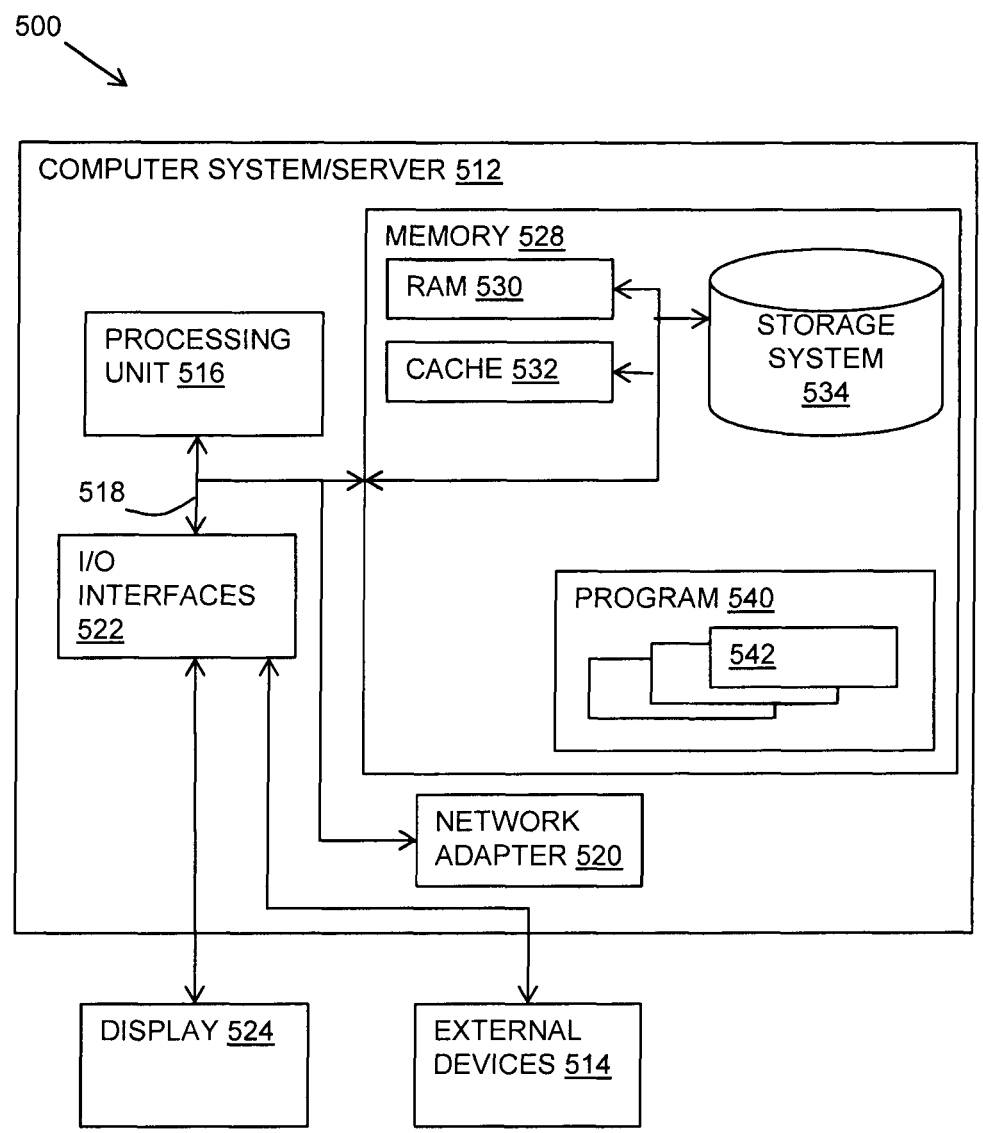
FIG. 5 is one example of a block diagram of an embodiment of a computer system or cloud server in which aspects of the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

As described herein, according to an aspect of the present invention, there is provided a computer-implemented method for providing hyperlinks in presentations viewed remotely, comprising: identifying a current user interface of an application being shared or recorded in a presentation for remote viewer computer systems; using an accessibility application programming interface to obtain a data structure of elements in the current user interface; interrogating the elements in the data structure to identify elements including hyperlinks; capturing hyperlink information for the identified element; and providing the hyperlink information for use by a remote viewer computer system.

According to a further aspect of the present invention, there is provided a system for providing hyperlinks in presentations viewed remotely, comprising: a processor and a memory configured to provide computer program instructions to the processor to execute the function of the components; a user interface identifying component for identifying a current user interface of an application being shared or recorded in a presentation for remote viewer computer systems; a client accessibility application programming interface component for interacting with an accessibility application programming interface including a data structure obtaining component for obtaining a data structure of elements in the current user interface; an element processing component for interrogating the elements in the data structure to identify elements including hyperlinks; a hyperlink information capturing component for capturing hyperlink information for the identified element; and a hyperlink output component for providing the hyperlink information for use by a remote viewer computer system.

According to yet a further aspect of the present invention, there is provided a computer program product for providing hyperlinks in presentations viewed remotely, the computer program product comprising a computer readable storage medium having program instructions embodied therewith, the program instructions executable by a processor to cause the processor to: identify a current user interface of an application being shared or recorded in a presentation for remote viewer computer systems; use an accessibility application programming interface to obtain a data structure of elements in the current user interface; interrogate the elements in the data structure to identify elements including hyperlinks; capture hyperlink information for the identified element; and provide the hyperlink information for use by a remote viewer computer system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
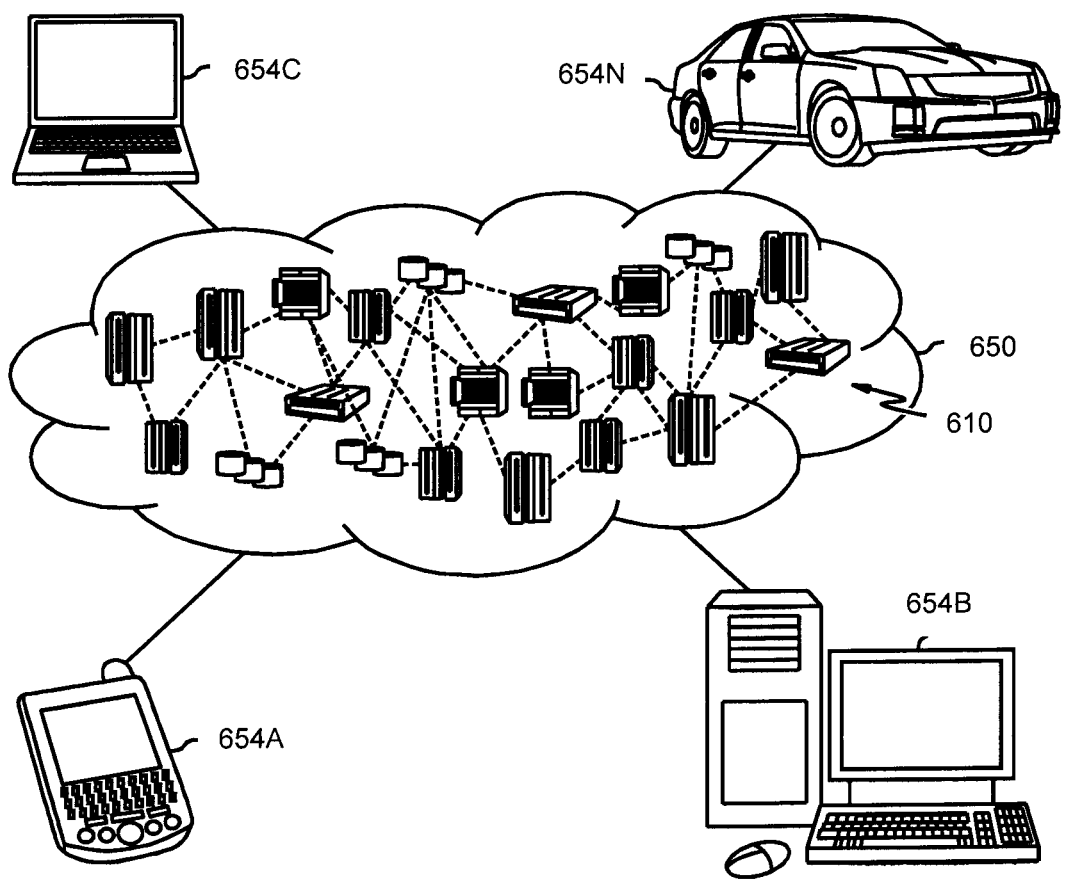
FIG. 6 is one example of a schematic diagram of a cloud computing environment in which aspects of the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
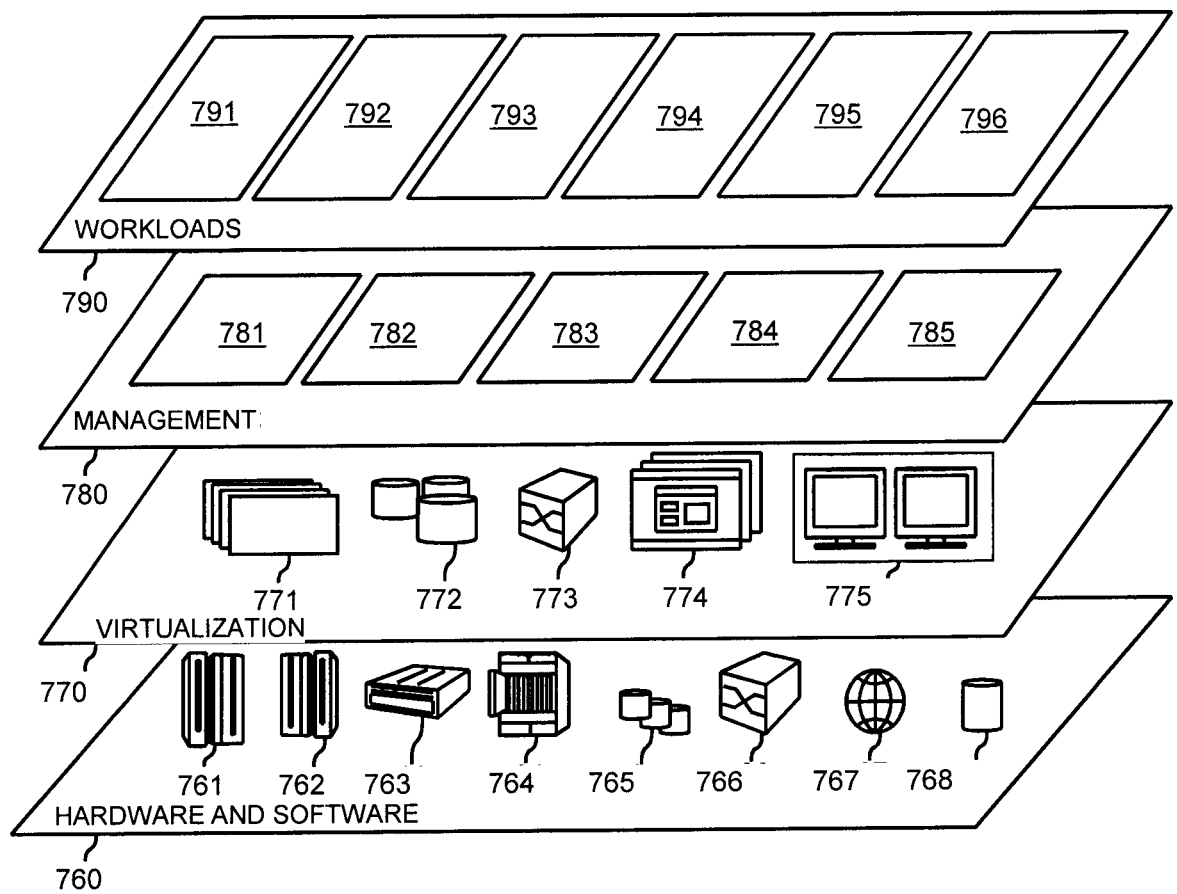
FIG. 7 is one example of a diagram of abstraction model layers of a cloud computing environment in which aspects of the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and presentation hyperlink providing processing 796.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

What is claimed is:

1. A computer-implemented method of providing hyperlinks in presentations viewed remotely, comprising:

identifying, by a presenter computer system, that a current user interface of the presenter computer system is displaying a plurality of application formats as part of a presentation, multiple application formats of the plurality of application formats including respective hyperlinks, the presenter computer system providing a display of the plurality of application formats as part of the presentation for viewing at one or more remote viewer computer systems, the respective hyperlinks being embedded within the display of the presentation for viewing at the one or more remote viewer computer systems, wherein a specific hyperlink of the respective hyperlinks embedded within the display of the presentation is non-activatable at the one or more remote viewer computer systems;

receiving, by the presenter computer system, a request from a remote viewer computer system of the one or more remote viewer computer systems to provide hyperlink related information for the specific hyperlink of the respective hyperlinks embedded within the display of the presentation, the requested hyperlink related information being usable by the remote viewer computer system to generate an activatable hyperlink corresponding to the specific hyperlink embedded within the display of the presentation;

based on receiving the request, using, by the presenter computer system, an accessibility application programming interface (API) of the presenter computer system to obtain the requested hyperlink information, the hyperlink information including a data structure of elements in the current user interface of the presenter computer system;

interrogating, by the presenter computer system, the elements in the data structure to identify one or more of the elements that include a hyperlink attribute of the requested hyperlink information for the specific hyperlink embedded within the presentation;

capturing, by the presenter computer system, the requested hyperlink information; and sending the captured hyperlink information to the remote viewer computer system for use by a user interface of the remote viewer computer system, the captured hyperlink information facilitating generating, by the remote viewer computer system, an activatable hyperlink corresponding to the specific hyperlink embedded in the display of the presentation, the activatable hyperlink being usable via the remote viewer computer system, and the activatable hyperlink to be displayed separately on the user interface from the non-activatable hyperlink embedded in the display on the user interface of the remote viewer computer system.

2. The computer-implemented method as claimed in claim 1, wherein the sending the captured hyperlink information to the remote viewer computer system includes dynamically providing the one or more elements that include the hyperlink attribute.

3. The computer-implemented method as claimed in claim 1, wherein the user interface of the remote viewer computer system is displaying the presentation as a live presentation being shared in real time.

4. The computer-implemented method as claimed in claim 1, further comprising:
   recording the presentation at a presenter computer system, and wherein the recording facilitates providing the captured hyperlink information as metadata.

5. The computer-implemented method as claimed in claim 1, further comprising iterating through child elements of the data structure to interrogate the elements of the data structure.

6. The computer-implemented method as claimed in claim 1, further comprising associating the requested hyperlink information captured with a label of the non-activatable hyperlink and a uniform resource locator of the non-activatable hyperlink.

7. The computer-implemented method as claimed in claim 1, wherein the interrogating the elements in the data structure to identify the one or more elements includes identifying a hyperlink protocol prefix.

8. The computer-implemented method as claimed in claim 1, wherein the interrogating the elements in the data structure to identify the one or more elements includes identifying a role of an element provided in the data structure.

9. A computer system for providing hyperlinks in presentations viewed remotely, comprising:
   a memory; and
   a processor in communication with the memory, wherein the computer system is configured to perform a method, said method comprising:
      identifying, by a presenter computer system, that a current user interface of the presenter computer system is displaying a plurality of application formats as part of a presentation, multiple application formats of the plurality of application formats including respective hyperlinks, the presenter computer system providing a display of the plurality of application formats as part of the presentation for viewing at one or more remote viewer computer systems, the respective hyperlinks being embedded within the display of the presentation for viewing at the one or more remote viewer computer systems, wherein a specific hyperlink of the respective hyperlinks embedded within the display of the presentation is non-activatable at the one or more remote viewer computer systems;
      receiving, by the presenter computer system, a request from a remote viewer computer system of the one or more remote viewer computer systems to provide hyperlink related information for the specific hyperlink of the respective hyperlinks embedded within the display of the presentation, the requested hyperlink related information being usable by the remote viewer computer system to generate an activatable hyperlink corresponding to the specific hyperlink embedded within the display of the presentation;
      based on receiving the request, using, by the presenter computer system, an accessibility application programming interface (API) of the presenter computer system to obtain the requested hyperlink information, the hyperlink information including a data structure of elements in the current user interface of the presenter computer system;
      interrogating, by the presenter computer system, the elements in the data structure to identify one or more of the elements that include a hyperlink attribute of the requested hyperlink information for the specific hyperlink embedded within the presentation;
      capturing, by the presenter computer system, the requested hyperlink information; and
      sending the captured hyperlink information to the remote viewer computer system for use by a user interface of the remote viewer computer system, the captured hyperlink information facilitating generating, by the remote viewer computer system, an activatable hyperlink corresponding to the specific hyperlink embedded in the display of the presentation, the activatable hyperlink being usable via the remote viewer computer system, and the activatable hyperlink to be displayed separately on the user interface from the non-activatable hyperlink embedded in the display on the user interface of the remote viewer computer system.

10. The computer system as claimed in claim 9, wherein the sending the captured hyperlink information to the remote viewer computer system includes dynamically providing the one or more elements that include the hyperlink attribute.

11. The computer system as claimed in claim 9, wherein the user interface of the remote viewer computer system is displaying the presentation as a live presentation being shared in real time.

12. The computer system as claimed in claim 9, wherein the method further comprises:
   recording the presentation at a presenter computer system, and wherein the recording facilitates providing the captured hyperlink information as metadata.

13. The computer system as claimed in claim 9, wherein the method further comprises iterating through child elements of the data structure to interrogate the elements of the data structure.

14. The computer system as claimed in claim 9, further comprising associating the requested hyperlink information captured with a label of the non-activatable hyperlink and a uniform resource locator of the non-activatable hyperlink.

15. A computer program product for providing hyperlinks in presentations viewed remotely, comprising:
   a computer readable storage medium readable by a processing circuit and storing instructions for performing a method comprising:
      identifying, by a presenter computer system, that a current user interface of the presenter computer system is displaying a plurality of application formats as part of a presentation, multiple application formats of the plurality of application formats including respective hyperlinks, the presenter computer system providing a display of the plurality of application formats as part of the presentation for viewing at one or more remote viewer computer systems, the respective hyperlinks being embedded within the display of the presentation for viewing at the one or more remote viewer computer systems, wherein a specific hyperlink of the respective hyperlinks embedded within the display of the presentation is non-activatable at the one or more remote viewer computer systems;
      receiving, by the presenter computer system, a request from a remote viewer computer system of the one or more remote viewer computer systems to provide hyperlink related information for the specific hyperlink of the respective hyperlinks embedded within the display of the presentation, the requested hyperlink related information being usable by the remote viewer computer system to generate an activatable hyperlink corresponding to the specific hyperlink embedded within the display of the presentation;

based on receiving the request, using, by the presenter computer system, an accessibility application programming interface (API) of the presenter computer system to obtain the requested hyperlink information, the hyperlink information including a data structure of elements in the current user interface of the presenter computer system;

interrogating, by the presenter computer system, the elements in the data structure to identify one or more of the elements that include a hyperlink attribute of the requested hyperlink information for the specific hyperlink embedded within the presentation;

capturing, by the presenter computer system, the requested hyperlink information; and sending the captured hyperlink information to the remote viewer computer system for use by a user interface of the remote viewer computer system, the captured hyperlink information facilitating generating, by the remote viewer computer system, an activatable hyperlink corresponding to the specific hyperlink embedded in the display of the presentation, the activatable hyperlink being usable via the remote viewer computer system, and the activatable hyperlink to be displayed separately on the user interface from the non-activatable hyperlink embedded in the display on the user interface of the remote viewer computer system.

16. The computer program product as claimed in claim 15, sending the captured hyperlink information to the remote viewer computer system includes dynamically providing the one or more elements that include the hyperlink attribute.

17. The computer program product as claimed in claim 15, wherein the user interface of the remote viewer computer system is displaying the presentation as a live presentation being shared in real time.

18. The computer program product as claimed in claim 15, wherein the method further comprises:
    recording the presentation at a presenter computer system, and wherein the recording facilitates providing the captured hyperlink information as metadata.

19. The computer program product as claimed in claim 15, wherein the method further comprises iterating through child elements of the data structure to interrogate the elements of the data structure.

20. The computer program product as claimed in claim 15, further comprising associating the requested hyperlink information captured with a label of the non-activatable hyperlink and a uniform resource locator of the non-activatable hyperlink.

* * * * *